(12) United States Patent
Ristau

(10) Patent No.: US 10,439,429 B2
(45) Date of Patent: Oct. 8, 2019

(54) MODULAR MICROGRID UNIT AND METHOD OF USE

(71) Applicant: Coritech Services, Inc., Royal Oak, MI (US)

(72) Inventor: Russell Ristau, Royal Oak, MI (US)

(73) Assignee: LEX PRODUCTS, LLC, Shelton, CT (US)

( * ) Notice: Subject to any disclaimer, the term of this patent is extended or adjusted under 35 U.S.C. 154(b) by 743 days.

(21) Appl. No.: 14/071,395

(22) Filed: Nov. 4, 2013

(65) Prior Publication Data

US 2017/0331325 A1  Nov. 16, 2017

Related U.S. Application Data

(60) Provisional application No. 61/721,809, filed on Nov. 2, 2012, provisional application No. 61/728,439, filed on Nov. 20, 2012.

(51) Int. Cl.
| | |
|---|---|
| *H02J 9/04* | (2006.01) |
| *H02J 3/14* | (2006.01) |
| *H02J 3/38* | (2006.01) |
| *G05B 15/02* | (2006.01) |

(52) U.S. Cl.
CPC ............. *H02J 9/04* (2013.01); *G05B 15/02* (2013.01); *H02J 3/14* (2013.01); *H02J 3/38* (2013.01); *H02J 3/383* (2013.01)

(58) Field of Classification Search
CPC ........................................................ H02J 9/04
See application file for complete search history.

(56) References Cited

U.S. PATENT DOCUMENTS

| | | | |
|---|---|---|---|
| 6,693,409 B2 | 2/2004 | Lynch et al. | |
| 6,765,370 B2 | 7/2004 | Bradley | |
| 6,819,087 B2 | 11/2004 | Delmerico et al. | |
| 7,656,059 B2 | 2/2010 | Wang et al. | |
| 8,164,217 B1 | 4/2012 | Miller | |
| 8,447,435 B1 | 5/2013 | Miller et al. | |
| 9,899,867 B2 * | 2/2018 | Brhlik | H02J 7/34 |
| 2007/0129110 A1 * | 6/2007 | Lasseter | H02J 3/38 |
| | | | 455/557 |
| 2007/0273210 A1 | 11/2007 | Wang et al. | |

(Continued)

FOREIGN PATENT DOCUMENTS

WO     2012012482 A    1/2012

*Primary Examiner* — Vincent H Tran
(74) *Attorney, Agent, or Firm* — Steven M. McHugh

(57) ABSTRACT

A method for controlling a stand-alone modular microgrid unit, including: detecting connection between the microgrid unit and a first power source having a first capacity and a second power source having a second capacity larger than the first capacity; detecting a power demand of a load connected to the microgrid unit; in response to a total power demand from loads electrically connected to the microgrid unit falling below the first capacity, controlling the first power source to operate in a power supply mode and supplying power to the load; in response to the total power demand exceeding the first capacity, disconnecting the load from the microgrid unit, controlling the second power source to operate in a power supply mode, and in response to the second power source producing a threshold amount of power, electrically connecting the load to the microgrid unit and supplying power to the load.

8 Claims, 6 Drawing Sheets

(56) References Cited

U.S. PATENT DOCUMENTS

| | | | |
|---|---|---|---|
| 2010/0274407 A1 | 10/2010 | Creed | |
| 2011/0082597 A1* | 4/2011 | Meagher | H02J 3/38 |
| | | | 700/291 |
| 2011/0279244 A1 | 11/2011 | Park et al. | |
| 2012/0232709 A1* | 9/2012 | Robinett, III | H02J 3/38 |
| | | | 700/286 |
| 2012/0306274 A1* | 12/2012 | Shetler, Jr. | H02J 9/062 |
| | | | 307/64 |
| 2013/0041516 A1* | 2/2013 | Rockenfeller | H02J 3/38 |
| | | | 700/287 |
| 2013/0057067 A1 | 3/2013 | Creed | |
| 2013/0069667 A1* | 3/2013 | Beg | G06F 1/263 |
| | | | 324/512 |
| 2014/0049229 A1* | 2/2014 | Li | H02J 3/32 |
| | | | 322/39 |
| 2014/0097683 A1* | 4/2014 | Piyabongkarn | H02J 3/32 |
| | | | 307/26 |
| 2014/0333225 A1* | 11/2014 | Radermacher | H05B 33/0827 |
| | | | 315/232 |

* cited by examiner

MODULAR MICROGRID UNIT AND METHOD OF USE

CROSS-REFERENCE TO RELATED APPLICATIONS

This application claims the benefit of U.S. Provisional Application No. 61/721,809 filed 2 Nov. 2012 and U.S. Provisional Application No. 61/728,439 filed 20 Nov. 2012 which are incorporated in their entirety by this reference.

TECHNICAL FIELD

This invention relates generally to the energy distribution field, and more specifically to a new and useful standalone microgrid unit in the energy distribution field.

BACKGROUND

There is often a need to have a stand-alone energy distribution system that is operable while disconnected from a utility grid. While microgrid systems exist for such an application, the pre-existing systems suffer from several drawbacks. Conventional systems run generators continuously, oftentimes outside of the generator's ideal efficiency range. This leads to wet stacking, which wastes fuel and reduces the lifetime of the generator. Additionally, introducing renewable power sources, such as photovoltaic (e.g., solar) systems, into conventional system has the effect of decreasing the generator efficiencies, as the amount of power provided by such systems are not easily anticipated and accommodated for. Furthermore, conventional systems are configured to only accept a single frequency of AC power, and cannot accommodate other generators that produce AC power at different frequencies. Hybrid systems have attempted to resolve this issue by incorporating a battery into the unit, wherein the load is powered by the battery and the battery is primarily charged by the renewable energy source. The battery is charged by a generator when the renewable energy source is insufficient to maintain the minimum state of charge. However, these hybrid systems do not enable capacity scaling, suffer from downtime when the battery falls below or nears the minimum state of charge, and cannot dynamically switch between generator power and battery power without interruption.

Thus, there is a need in the energy distribution field to create a new and useful standalone microgrid unit capable of scaling to increase power capacity.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
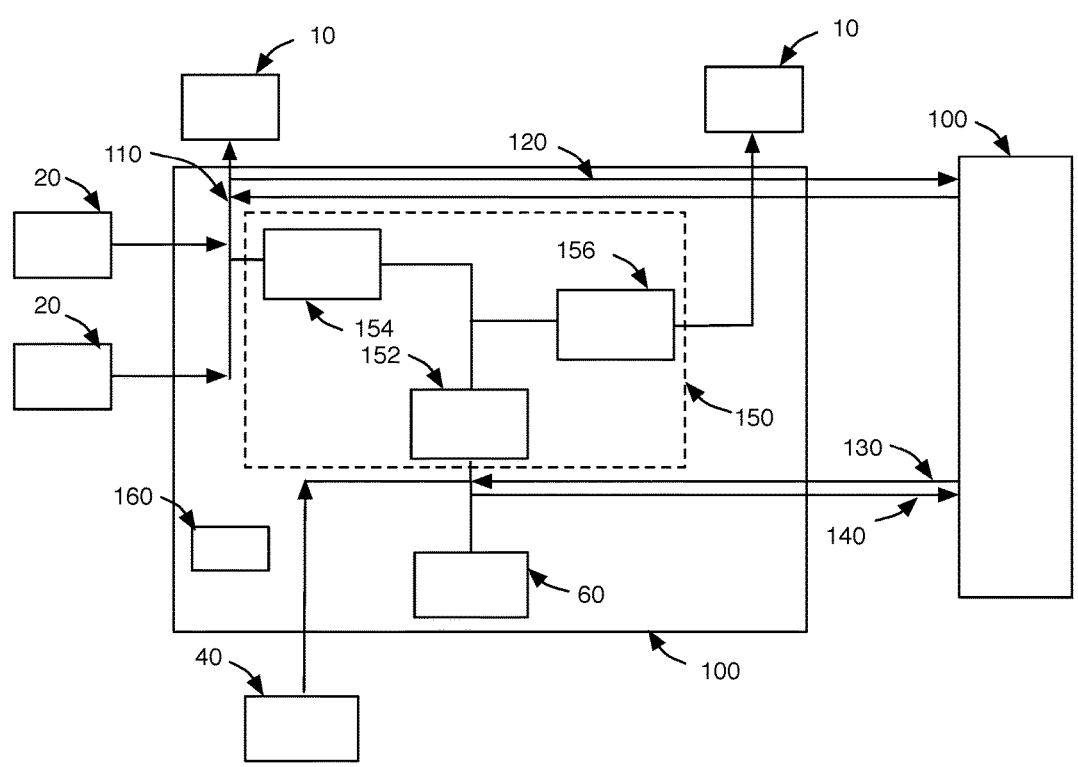
FIG. 1 is a schematic representation of a variation of the microgrid unit.
Figure 2:
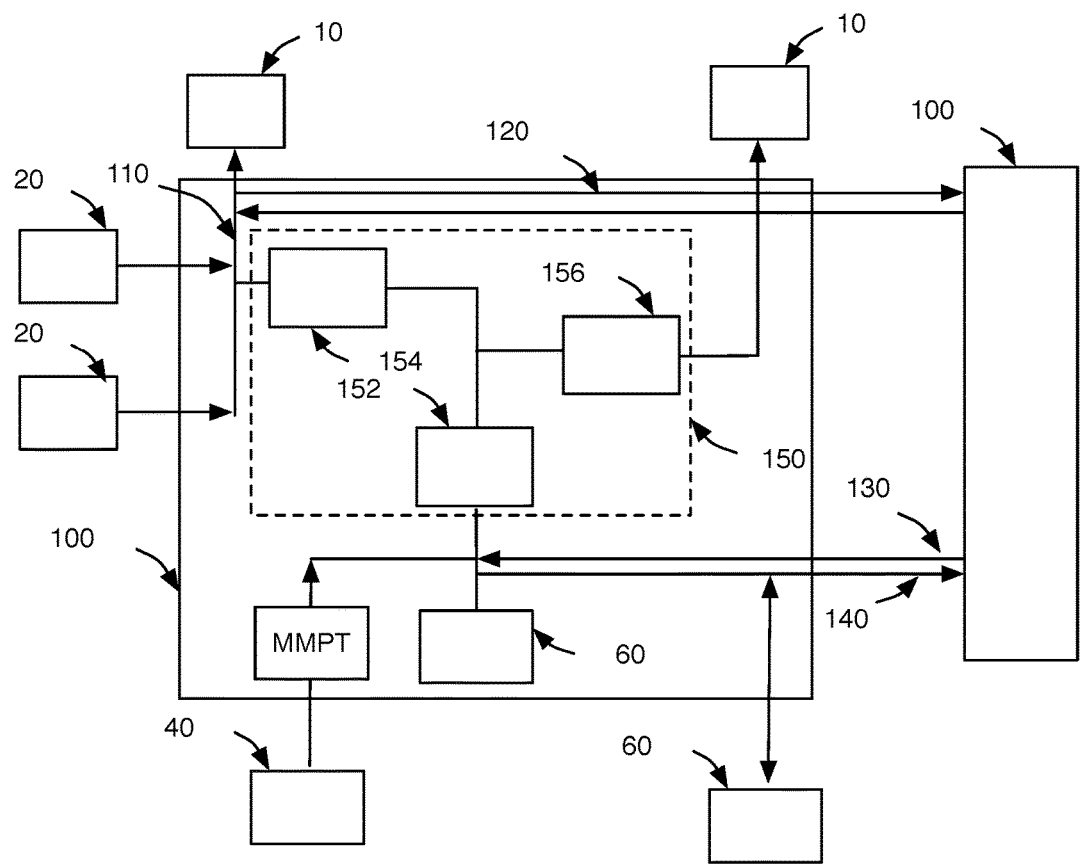
FIG. 2 is a schematic representation of a variation of the microgrid unit for use with a solar array.

As shown in FIGS. 1 and 2, a modular microgrid unit too for managing power transfer between a plurality of power sources and a plurality of loads includes an AC input bus 110 configured to receive AC power from an AC power source, an AC output bus 120 configured to provide AC output power to a load, a DC input bus 130 configured to receive DC power from a DC power source, a DC output bus 140 configured to provide DC power to a load, a power conversion module 150 configured to convert the received AC power into DC power, and to convert DC power to AC output power, and a processor 160 controlling a series of switches to selectively operate the plurality of power sources and selectively connect and disconnect the plurality of loads from the microgrid unit.

Figure 3:
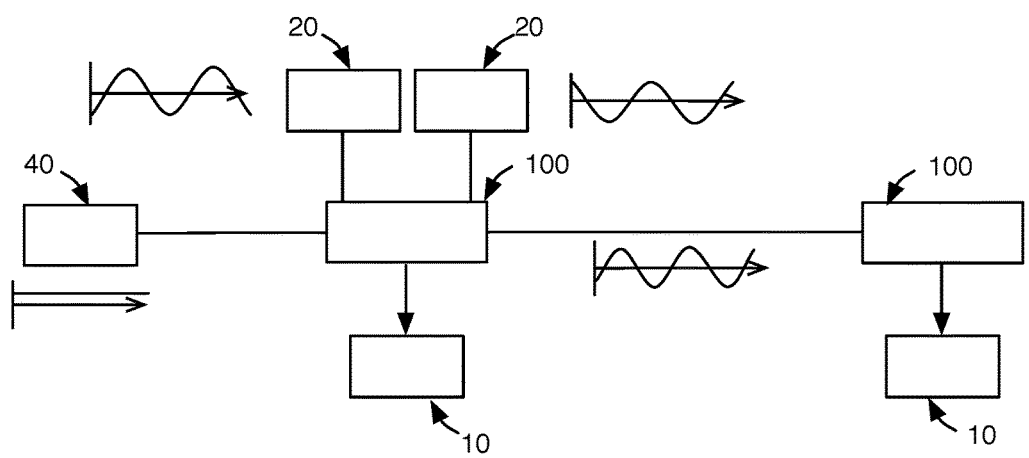
FIG. 3 is a schematic representation of a microgrid system including a first and a second microgrid unit connected to a first and a second AC power source having different frequencies and synchronization, a DC power source, and a first and a second load.

As shown in FIG. 3, the microgrid unit functions to receive a range of power inputs (e.g., different AC frequencies, different voltages, etc.) and provide a standardized power output, such as conditioned, true sine wave AC power. The microgrid unit additionally functions to maximize power source efficiency by automatically managing power source operation. The microgrid unit additionally functions to minimize power provision downtime and blackouts by automatically dropping low priority loads and by prioritizing generator power over inconsistent power sources. The microgrid unit power source prioritization scheme can additionally function to maintain external energy storage units (e.g., electric vehicle storage banks) at a substantially high state of charge (e.g., over or close to a charged threshold), which can facilitate on the fly disconnection and use of the external energy storage unit. The microgrid unit additionally functions to couple with other microgrid units to scale (e.g., increase) power and load capacity.

The microgrid unit is preferably used in a microgrid system that includes a plurality of microgrid units, but can alternatively be used alone. Each microgrid unit in the system is preferably operable between a connected mode and a standalone mode, dependent upon whether or not the microgrid unit is electrically connected to a second microgrid unit, respectively. The microgrid units in the microgrid system are preferably substantially identical (e.g., of the same model and configuration), but can alternatively be different microgrid units. The microgrid system and units are configured to operate while disconnected from main utility grid, but can alternatively be configured to operate when connected to a main utility grid, wherein the utility grid functions as an AC input power source. The microgrid units in the microgrid system are preferably connected in a grid-parallel configuration, but can alternatively be connected in series, connected in parallel along a common bus formed from the AC and/or DC output busses of the respective microgrid units, or connected in any other suitable configuration. The microgrid unit is preferably used in military applications, but can alternatively be used for commercial purposes, in off-grid power distribution applications, or used for any other suitable application.

The microgrid unit can confer several benefits over conventional systems. First, by converting the received AC power into DC power and converting the DC power to AC output power, the microgrid unit is capable of accepting a wide range of AC input power (e.g., a wide range of unsynchronized power), which allows multiple types of generators and power sources to be utilized simultaneously. Second, in contrast to conventional systems, the microgrid unit prioritizes generator power over inconsistent power sources such as photovoltaic cells. While this might result in increased in fuel use, this prioritization results in decreased system downtime, increased battery charging, and increased generator efficiency over conventional hybrid distribution systems. Instead of incurring the system downtime that occurs in conventional hybrid systems during generator ramp-up for battery recharging, the battery is used to supply auxiliary power during power source switching (e.g., switching between generators) or during generator failure, thereby resulting in a more consistent power supply. Cyclic system downtime due to battery discharging can be avoided by leveraging the more reliable generator source. Additionally, this power management scheme effectively decouples the inconsistent power supply from generator power operation, thereby removing the negative effects of inconsistent power supply on the generator to allow the generator to operate within a high efficiency range (e.g., 50%-90% capacity), while still leveraging the inconsistent power source. Prioritizing the fuel-consuming sources over the non-fuel consuming sources can additionally have the benefit of maintaining a high state of charge (SOC) for auxiliary power storage units (external power storage units), such as electric vehicles. Third, the microgrid unit avoids high-priority load shutdown or blackouts by disconnecting low priority loads when the total power demand exceeds the power capacity of the operating power sources.

The microgrid unit is preferably dimensioned to be mobile, but can alternatively be configured for substantially static operation. In one variation, the microgrid unit is dimensioned to fit on a standard shipping pallet (e.g., 40 in×48 in) and be movable by a fork lift. In another variation, the microgrid unit is substantially cubic (e.g., 4 ft×4 ft×4 ft), and includes transportation connections (e.g., forklift access) on one or more sides. However, the microgrid unit can be dimensioned to fit within a standard shipping container (e.g., intermodal freight container) or be otherwise dimensioned.

The microgrid unit is preferably capable of connecting to and controlling the operation of a plurality of power supplies. Each power supply is preferably operable between a power supply mode and an off or standby mode. The microgrid unit is preferably configured to control the operation modes of the power supplies. For example, the microgrid unit is preferably configured to control the operation of a connected generator between a power supply mode (e.g., instruct the generator to start generating power) and an off mode (e.g., instruct the generator to stop generating power). The microgrid unit can additionally function to control fuel supply to the power source (e.g., fuel flow rate, etc.). The microgrid unit is preferably additionally capable of monitoring the power source operation status. The power supply preferably provides power to the microgrid unit in the power supply mode, and preferably does not supply power to the microgrid unit in the off or standby mode. The power supply operation mode is preferably controlled by the microgrid unit, more preferably through a series of switches controlled by the microgrid unit processor, but can alternatively be controlled through wireless communication systems (e.g., remotely controlled) or controlled in any other suitable manner. The power supplies can be included in the microgrid system, or be separate from the microgrid system. The power supplies can include DC power sources 40 and/or AC power sources 20. The AC power sources 20 can have a variety of frequencies (e.g., 50 Hz, 60 Hz, 400 Hz) and a variety of voltages. The AC power sources can provide 2-phase power, 3-phase power, or any other suitable power. For example, the AC power sources can be 208/120 or 480/277 VAC 3 phase, 4-wire, or 50-60 Hz power supplies. The DC power sources 40 can be supplied at any suitable voltage. The power supplies can be a source of substantially constant power (e.g., with less than 10% variation in supplied power while in operation) and/or inconsistent power (e.g., with high levels of variation in supplied power, such as over 30% variation). The power supplies can include fuel consuming power supplies (e.g., generators) and/or non-fuel consuming power supplies (e.g., renewable energy sources). Examples of AC power sources include generators and utility grids. Examples of DC power sources include renewable energy sources (e.g., carbon neutral sources), such as solar (e.g., photovoltaic systems), wind energy (e.g., electrohydrodynamic or EHD systems, turbine systems, etc.), hydroelectric energy, fuel cell energy (e.g., from hydrogen or hydrocarbon fuel), or any other suitable renewable energy source. DC power sources can additionally include power storage units 60 (energy storage units), such as secondary batteries such as lithium chemistry batteries or nickel cadmium batteries and ultracapacitors. The power storage units can be dedicated energy storage banks, energy storage for electric vehicles, energy storage for portable computing devices, or be any other suitable energy storage unit, and can receive power from or provide power to the microgrid unit and/or loads connected to the microgrid unit.

The microgrid unit is preferably capable of supporting a range of power. For example, the microgrid unit can support a power range of 10-60 Kw per module, with increased capacity for each additional connected microgrid unit. The microgrid unit is preferably capable of accepting 2-phase and 3-phase power of a variety of frequencies. The microgrid unit preferably outputs AC power at a predetermined output power having output power parameters, such as an output frequency, voltage, phase angle, phase sequence, and waveform (e.g., 208/120 VAC 4-wire, 3-phase Y or 480/277 VAC 4-wire 3-phase Y at 50-60 Hz). Alternatively, the microgrid unit identifies the most reliable power input (e.g., substantially constant, having a variation below a threshold percentage, etc.) and outputs power that is synchronized with the power of the identified power source (e.g., having the frequency, voltage, phase angle, phase sequence, and waveform of the identified power source). This variation functions to increase the power efficiency of the system as the power from the identified power source is supplied directly to the load to without processing. In the connected mode, the output power of the microgrid unit is preferably synchronized with the output power of the other units. In one variation of the system, a master controller (e.g., a processor of a connected microgrid unit or a separate computing system) determines and communicates the parameters of the output power to the remaining connected microgrid units (e.g., through data or power). In another variation of the system, the processors of the connected microgrid units cooperatively determine and set the output power. However, the output frequency can be otherwise determined.

The AC input bus 110 of the microgrid unit 100 functions to connect to and receive AC power from an AC power source 20, such as a generator. The AC input bus can be a 2-phase AC bus, a 3-phase AC bus, or any other suitable AC input bus. The microgrid unit preferably includes three AC input busses, but can alternatively include any suitable number of AC input busses. Multiple AC input busses preferably connect coupled power sources in parallel, but can alternatively connect the power sources in series. The AC input bus can additionally include a switch configured to selectively connect a coupled AC power source to the load or power module. The AC input bus can additionally include a communication line configured to transfer data (e.g., operation commands) from the processor to the AC power source. In one variation of the microgrid unit, the unit includes three, three-phase AC input busses and one AC bus including an inlet and an outlet for connection with a secondary and tertiary microgrid unit. However, the microgrid unit can include any suitable number of AC input busses. The busses are preferably operable between an unconditioned, conditioned, and import mode. In the unconditioned mode, the bus is configured to supply power directly from the power source (e.g., generator) to the load, bypassing the converter and any other suitable conditioning circuit. In the conditioned mode, the bus is electrically connects the power supply and the load to the converter, wherein the power is conditioned by the converter prior to supply to the load. In the import mode, all power on the bus is received from the external AC bus (e.g., from a secondary connected module).

The AC output bus 120 of the microgrid unit 100 functions to provide AC power to a load to or to a secondary microgrid unit 100. The AC output bus can be a 2-phase AC bus, a 3-phase AC bus, a single phase bus, or any other suitable AC output bus. The microgrid unit preferably includes three AC output busses, but can alternatively include any suitable number of AC output busses. Multiple AC output busses preferably connect coupled loads in parallel, but can alternatively connect the loads in series. The AC output bus can additionally include a switch configured to selectively connect a coupled load to the power source or power module. The AC output bus can additionally include a communication line configured to transfer data from the processor to the load. The AC output bus can be a conditioned output bus 122 or an unconditioned output bus 124. The conditioned output bus connects an AC outlet to the power module and transfers power conditioned by the power module (conditioned power). The unconditioned output bus directly connects an AC outlet to an AC power source inlet. In one variation of the microgrid unit, the unit includes two unconditioned AC output busses (e.g., for 3-phase power) and three conditioned AC output busses (e.g., one 3-phase power and two single phase power). However, the microgrid unit can include any suitable number of AC output busses.

The DC input bus 130 of the microgrid unit too functions to connect to and receive DC power from a DC power source 40, such as a renewable energy source, an energy storage unit 60, or a secondary microgrid unit 100. The microgrid unit preferably includes one DC input busses, but can alternatively include any suitable number of DC input busses. Multiple DC input busses preferably connect coupled power sources in parallel, but can alternatively connect the power sources in series. The DC input bus can additionally include a switch configured to selectively connect a coupled DC power source to the load or power module. The DC input bus can additionally include a communication line configured to transfer data from the processor to the DC power source. The DC input bus can additionally include an energy storage unit connected in parallel or in series with a coupled DC power source. The energy storage unit (e.g., one or more ultracapacitors, etc.) can function to smooth out the power supply curve from the DC power source. In one variation of the microgrid unit, the unit includes one DC input bus capable of receiving power from a renewable energy source (e.g., power from a photovoltaic cell array), wherein the DC input bus is connected in series or in parallel to an energy storage unit, such as a battery. The DC input bus can additionally be connected to a maximum power point tracking (MPPT) system. However, the microgrid unit can include any suitable number of DC input busses.

The DC output bus 140 of the microgrid unit too functions to connect to and supply DC power to a DC load (e.g., an external energy storage unit, such as a battery bank) or a secondary microgrid unit 100 from the DC power source 40 or an internal energy storage unit 60. The microgrid unit preferably includes one DC output bus, but can alternatively include any suitable number of DC output busses. Multiple DC output busses preferably connect coupled loads in parallel, but can alternatively connect the loads in series. The DC output bus preferably electrically connects the loads to the power module or internal energy storage unit in parallel, but can alternatively connect the loads to the power module or internal storage unit in series. The DC output bus can additionally include a switch configured to selectively connect a coupled load to the power module or internal energy storage unit. The DC output bus can additionally include a communication line configured to transfer data from the processor to the load. In one variation of the microgrid unit, the unit includes one DC bus, including an input and an output, configured to connect to a secondary and tertiary microgrid unit, respectively. The DC bus is connected in parallel to one or more ultracapacitors. However, the microgrid unit can include any suitable number of DC busses.

The power conversion module 150 of the microgrid unit functions to condition the power received from the power sources. The power module preferably converts AC power into DC power, and into AC output power having output power. The power module preferably additionally converts DC power of a first voltage into DC power having a second voltage, such as an energy storage unit voltage (e.g., battery voltage) or DC output voltage. However, the power module can alternatively condition the power in any other suitable manner. The power conversion module 150 preferably includes a converter 152, a rectifier 154, and an inverter 156. The power module can additionally include a power router. The power module is preferably configured such that no transformer is required, but can alternatively include a transformer. The converter 152 is preferably electrically connected in series but alternatively in parallel to the DC input bus 130, and can additionally be electrically connected in series, but alternatively in parallel, to an internal energy storage unit 60. The converter is preferably a bidirectional DC/DC converter, but can alternatively be any other suitable converter. The rectifier 154 functions to convert input AC power to DC power. The rectifier is preferably an active rectifier, but can alternatively be a passive rectifier. The rectifier output can be connected to the converter 152 for conversion to DC output power or to power suitable for the internal energy storage unit 60. The rectifier output can additionally be connected to the inverter input. In one variation, the microgrid unit includes a first and a second rectifier connected in parallel to the AC input busses. However, the microgrid unit can include any suitable number of rectifiers in any other suitable configuration. The inverter 156 functions to convert DC power from the rectifier 154 or converter 152 into AC output power. The inverter is preferably configured to output AC power at a predetermined frequency (e.g., 60 Hz), but can alternatively be configured to dynamically adjust the frequency of the AC output power based on the frequency of the most reliable power supplied (e.g., as determined by the processor). The inverter is preferably a true sine wave inverter, but can alternatively be a square wave inverter, modified sine wave inverter, pulsed sine wave inverter, or any other suitable inverter. The power router of the rectifier functions to control the direction of power flow, wherein the power busses can support bidirectional power flow. In particular, the power router functions to control the direction of power flow between the internal energy storage unit and the power module. For example, the power router can route excess power from external power sources to the internal energy storage unit, and route power from the internal energy storage unit to the power module for distribution to loads in response to a deficit in supplied power. The power router can additionally function to control the direction of power flow between the DC load (e.g., wherein the DC load can be an external battery or the internal battery of a secondary microgrid unit) and the power module. For example, the power router can route excess power from the power module to the DC load, and route power from the DC load to the power module for distribution to loads in response to a deficit in supplied power. However, the power router can control the flow of any other suitable power through the system.

The processor 160 of the microgrid unit functions to select an optimal combination of power sources based upon the power demand from the connected loads. The processor can additionally function to select which load to shed and to disconnect the selected load in response to a total power demand exceeding the power capacity of the connected power sources. The processor can additionally function to determine a lead AC power source (e.g., the most stable AC power supplied). The processor can additionally function to determine whether power should be supplied directly to the load or conditioned prior to power supply to the load. The processor can additionally function to operate the microgrid unit(s) between one or more operation modes. The processor is preferably a CPU, but can alternatively be a microprocessor or any other suitable processor. The processor is preferably connected to and controls a series of switches controlling AC input bus, AC output bus, DC input bus, DC output bus connection to the power sources (20, 40) and load to, respectively.

The processor 160 functions to dynamically select an optimal combination of power sources to meet the power demand of the load. The processor preferably selects the combination of power sources by optimizing the values for a set of optimization parameters. The optimization parameters can include the individual capacities of each power source (e.g., based on the maximum efficiency capacity for each power source, such as between 50-90% of the maximum capacity of the power source), the power demand of the load, and the electrical distance (e.g., circuit distance, number of modules, etc.) of the load from the selected power sources for operation. The optimization parameters can additionally include the current or projected price of fuel (e.g., as retrieved from online markets when the microgrid unit is networked to an external server, as received from a user, etc.), current or projected environmental parameters (e.g., as determined from environmental sensor measurements), predicted or measured energy losses over power lines or based on any other suitable optimization parameter. In one variation of the microgrid unit, the processor selects the power sources to minimize the capacity used to meet the power demand and to minimize the electrical distance between the selected power sources and the load. In another variation of the microgrid unit, the processor selects the power sources to minimize fuel costs (e.g., based on hydrogen gas prices and hydrocarbon gas prices). In another variation of the microgrid unit, the processor selects the power sources to maximize renewable energy source usage and minimize fuel-consuming power source usage when the renewable energy sources can supply substantially continuous power over a threshold power level. The power sources can additionally be selected based on a set of priorities. For example, providing a continuous power supply and maximizing power source efficiency can be prioritized higher than minimizing fuel costs. However, the combination of power sources can be otherwise selected.

The power source capacities can be predetermined or dynamically determined. In one variation, the microgrid unit can retrieve the capacity associated from the power source from memory (e.g., on-board or remote memory) in response to microgrid unit connection with the power source (e.g., based on a power source identifier). In another variation, the microgrid unit receives the capacity associated with the power source from the power source, wherein the power source communicates the capacity to the microgrid unit. In another variation, the microgrid unit receives the capacity associated with the power source from a user that manually associates the power source with the capacity value. In another variation, the microgrid unit dynamically determines the power source capacity by increasing the load on the power source until the power from the power source drops. The load at which the power dropped is stored as the maximum capacity associated with the power source. In another variation, the microgrid unit dynamically calculates the power source capacity based on the measured current from the power source. In another variation, the microgrid unit determines the capacity based on the state of charge of an energy storage unit connected to the power source (e.g., for a renewable power source). However, the power source capacity can be otherwise determined.

The processor 160 can additionally function to dynamically select a load to to shed in response to the total power demand from the connected loads exceeding the maximum capacity of the power sources in operation. The one or more loads are preferably shed (e.g., disconnected or instructed to shut down) when the power demand exceeds the power supplied for a threshold period of time (e.g., 1 second, 10 seconds, 1 minute, etc.), but can alternatively be dropped immediately when the power demand exceeds the power supplied or dropped in response to the occurrence of any other suitable load shedding event. The processor preferably selects low-priority loads to drop, but can alternatively select medium or high priority loads to drop. The load or outlet priority is preferably received from a user (e.g., from a user entry), but can alternatively be determined based upon the power on the respective output bus (e.g., wherein load priority is correlated with the amount of current or power pulled), based on the power demand history (e.g., wherein loads with a substantially constant power demand are prioritized higher than loads with highly variable power demands), based on past prioritization, based on the manual shutoff history of the given load, based on the priority that other users have assigned to similar load types, based on the identifier of the load, or based on any other suitable operation parameter of the load. The processor can select and drop (e.g., disconnect) loads based on the respective priorities until the total power demand decreases below the power capacity of the power sources in operation, select and drop a combination of loads simultaneously, or simultaneously drop all loads and incrementally reconnect loads based on the respective load priority while the total power demand remains below the power capacity of the operational power sources. The processor can additionally record the total power demand prior to load disconnection, select a new combination of power sources to meet the prior total power demand, control the new combination of power sources to operate in the power supply mode, and reconnect all the loads that were previously disconnected. The processor can additionally record the power demand from each load (e.g., prior to disconnection), and determine which load to reconnect based on the recorded power demand. The dropped loads can be reconnected simultaneously, reconnected in sets, reconnected individually (e.g., consecutively) based on the individual power demand or the respective priority, or reconnected in any other suitable grouping. Alternatively, the processor can temporarily provide power from the energy storage units to accommodate for the power demand in excess of power supply (e.g., without dropping any loads) while selecting the new combination of power sources.

The processor 160 can additionally function to control the microgrid unit too to balance the energy storage units 60. The processor can balance the internal and external energy storage units, only the internal energy storage units, or only the external energy storage units. In one variation, the processor balances the energy storage units with power from energy storage units with high states of charge. More specifically, the processor determines the states of charge for a set of energy storage units to be balanced, selects a set of donor cells and a set of receiver cells from the set, and controls a plurality of switches to connect each donor cell to one of the receiver cells, wherein the donor cells charge the receiver cells. In another variation, the processor balances the set of energy storage units by selectively providing power to the batteries with low states of charge. More specifically, the processor determines the states of charge (SOCs) for a set of energy storage units to be balanced, identifies a first subset of cells within the set having SOCs above a SOC threshold and a second set of cells below the SOC threshold, determines the power sources supplying the first subset of cells with power, and controls a set of switches to route power from the determined power sources from the first set of cells to one or more of the second set of cells (e.g., to supply the second set of cells with power) until the respective SOCs of the second set of cells exceeds the SOC threshold.

Alternatively, the processor 160 can prioritize external storage unit charging over internal energy storage unit charging, wherein power from renewable energy sources, excess generator power, and/or internal energy storage unit power is preferentially supplied to the external storage unit, with the internal energy storage units functioning to adsorb excess energy (e.g., after the external storage units have reached a threshold state of charge, such as 95% SOC). The external energy storage units are preferably prioritized after the remainder of the loads (e.g., after the power demand of the other loads are satisfied), but can alternatively be prioritized higher than the remainder of the loads (e.g., charged before the other loads are powered).

The microgrid unit too can additionally include a set of sensors that function to monitor (e.g., meter) the power provision and power demand states of the power sources and loads, respectively. The sensors can additionally function to monitor operation parameters of the microgrid unit. The measurements are preferably sent and processed by the processor. The microgrid unit can include a current sensor (e.g., a Hall effect sensor), a voltage sensor, a temperature sensor, humidity sensor, or any other suitable sensor. The power sensors (e.g., current and voltage sensors) are preferably arranged on or about the AC and DC busses, but can alternatively be arranged elsewhere in the microgrid. The operation sensors (e.g., temperature sensor, humidity sensor, etc.) are preferably arranged proximal the processor, but can alternatively be arranged elsewhere.

The microgrid unit 100 can additionally include environmental parameter sensors that function to measure the environmental parameters of the microgrid unit ambient environment (e.g., external environment). The environmental parameter measurements are preferably used to determine which power source to route power from (e.g., power source priority). The environmental parameter measurements can additionally be used to predict future power generation from a renewable power source (e.g., beyond a time threshold, such as the ramp-down time required for a generator). The environmental sensors can include a light sensor, humidity sensor, temperature sensor, flow rate sensor (e.g., a Pitot tube or any other suitable wind speed sensor), or any other suitable sensor. In one variation, the processor can select to directly route power from a renewable energy source in response to determination that the renewable energy source will be a substantially constant or reliable source of power (e.g., will be maintained above a threshold power level, such as above 10 kW), based upon the environmental parameter measurement. For example, the processor can select to directly route power from the battery connected to a solar cell array in response to a light sensor measurement indicative of predicted light levels above a light threshold. In another variation, the processor can predict renewable power source energy provision based upon the environmental parameter measurement and selectively shut down generator operation based upon the predicted renewable power. For example, the processor can select to ramp down a first generator when the minimum amount of energy from the renewable energy source (e.g., from an electrohydrodynamic system) is predicted to be sufficient to supplement the remnants of the first generator power to meet the power demand from the load.

The microgrid unit too can additionally include an internal energy storage unit, which functions to store and supply electrical power. The internal energy storage unit can function as an energy sink for excess energy supplied by the power sources, thereby enabling the power sources to be operated at full efficiency. The internal energy storage unit can additionally function to supply electrical energy to compensate for energy production fluctuations or sudden increases in power demand from the loads. The internal energy storage unit can additionally function to smooth out power fluctuations from the power supply, such as power from intermittent sources (e.g., renewable sources). The internal energy storage unit can include a secondary battery (e.g., rechargeable battery), such as lithium chemistry batteries (e.g., lithium ion battery, etc.) or nickel cadmium batteries, an ultracapacitor, or any other suitable energy storage device. The microgrid unit preferably includes several internal energy storage units of varying types, but can alternatively include any suitable number of any suitable energy storage unit type.

The microgrid unit too can additionally include a communication line, which functions to communicate instructions from the processor to secondary microgrid units connected to the microgrid unit. The communication line is preferably a fiberoptic line, but can alternatively be a copper cable or any other suitable communication line. The microgrid unit preferably includes two communication lines, a first communication line for controller communication and a second communication line for converter synchronization (e.g., between connected microgrid units), but can alternatively include any suitable number of communication lines. The communication lines preferably connect the processors of a first and second microgrid unit in parallel, but can alternatively connect the processors in series.

The microgrid unit too can additionally include a cooling system that functions to cool the microgrid unit electronics, such as the power module, processor, busses, and/or sensors. The cooling system can be a liquid cooling system, a forced air cooling system (e.g., with fins, etc.) or any other suitable cooling system. The liquid cooling system preferably includes a cold plate thermally and fluidly connected to a cooling channel through which a cooling fluid is moved. The cold plate is preferably directly thermally coupled to the electronic components to be cooled. In one variation of the microgrid unit, the electronic components are directly mounted to the cold plate. The cooling fluid can be water, coolant, air, or any other suitable fluid capable of conducting and/or convecting heat. The cooling fluid is preferably moved through the cooling channel by a pump, fan, or any other suitable mechanism capable of circulating cooling fluid through the cooling channel. The liquid cooling system is preferably substantially fluidly sealed, but can alternatively be open to the ambient environment.

The microgrid unit 100 can additionally include a casing that functions to mechanically protect the electronics from the ambient environment. The casing can be substantially fluidly sealed, but can alternatively be partially open to the ambient environment (e.g., include cooling openings for air). The casing can additionally provide EMI shielding for the internal components, but can alternatively include an EMI (electro-magnetic interference) shield within the casing, The microgrid unit 100 is preferably operable between a plurality of different operation modes. The processor preferably selects the operation modes and executes the selected operation modes by controlling the respective switches and components. However, the processor can execute the selected operation modes based on control information received from a secondary microgrid unit, particularly when the secondary microgrid unit is set as a master controller and the primary microgrid unit is set as the slave controller. Alternatively, the operation mode selection and microgrid unit operation can be controlled by an external controller or processor.

Figure 4:
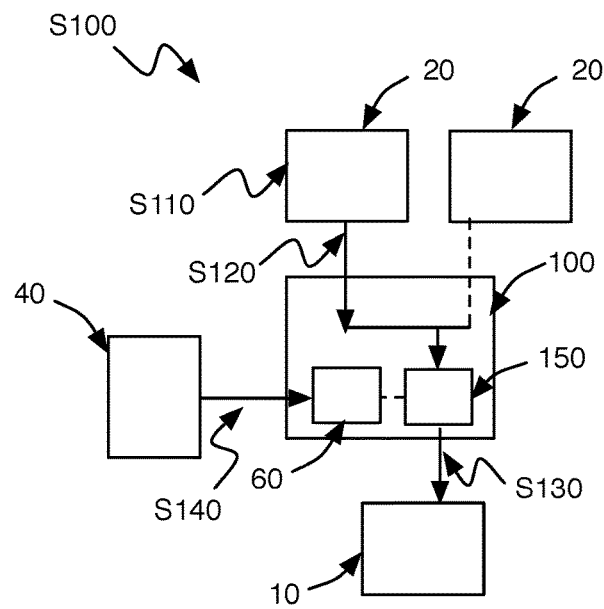
FIG. 4 is a schematic representation of a variation of the microgrid unit operating in the standalone mode.

The microgrid unit is preferably operable between a standalone mode S100 and a connected mode S200. However, the microgrid unit can additionally be operable in any other suitable number of modes. The microgrid unit is preferably operable in the standalone mode S100 when the microgrid unit is not connected to any other microgrid units. However, the user can manually switch a microgrid unit (primary unit) that is connected to other microgrid units (secondary units) into the standalone mode, wherein the primary unit is limited to using its own power sources to power its own loads. When a unit is in standalone mode while connected to other units, the unit will function as a slave and will be synchronized to the master unit (e.g., the converter will be synchronized). In the standalone mode, the microgrid unit preferably optimizes power provision from the connected power sources to the connected loads, optimizes power source operation, and selectively drops loads based on the respective priority, as described above. The microgrid unit can additionally balance the internal and external power storage unit, dynamically reroute power from the internal power storage unit to the external power storage unit (or vice versa). The microgrid unit can operate in the standalone mode in response to microgrid unit connection to a load and an AC and/or DC power sources, or detection of power demand from a load. In one variation of the standalone mode S100, as shown in FIG. 4, the microgrid unit selects the AC power source having the lowest capacity that satisfies the power demand from the load S110, operates the selected power source in the power supply mode S120, and provides the power to the load S130. The microgrid unit can additionally charge an internal energy storage unit with power from the DC source S140, wherein the battery power can be used to supplement the AC power source when the power demand exceeds the power supply.

Figure 5:
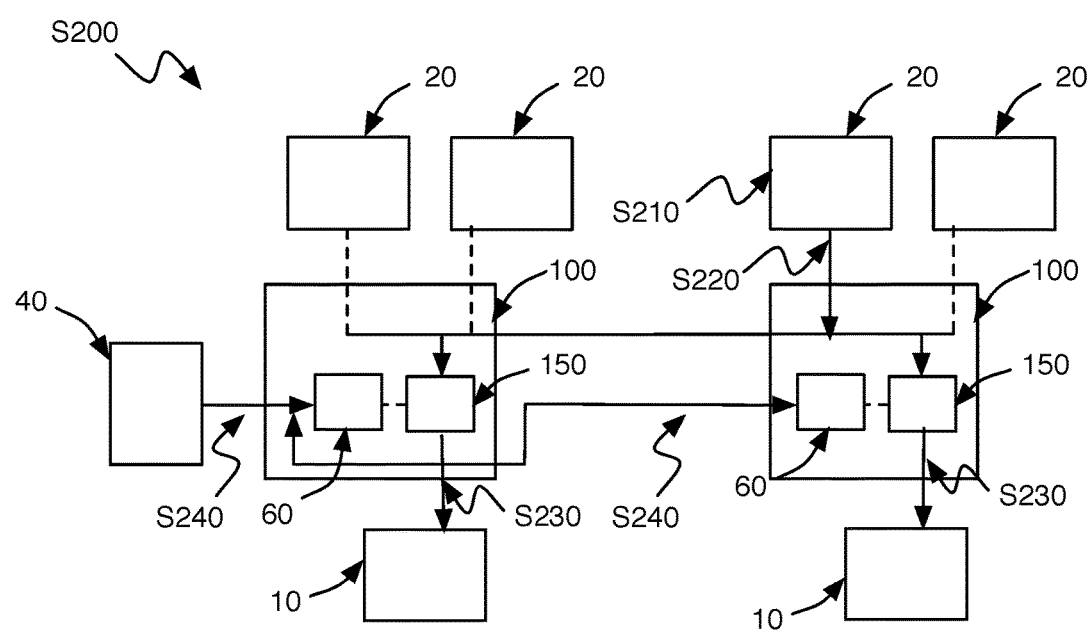
FIG. 5 is a schematic representation of a variation of the microgrid unit operating in the connected mode.
Figure 6:
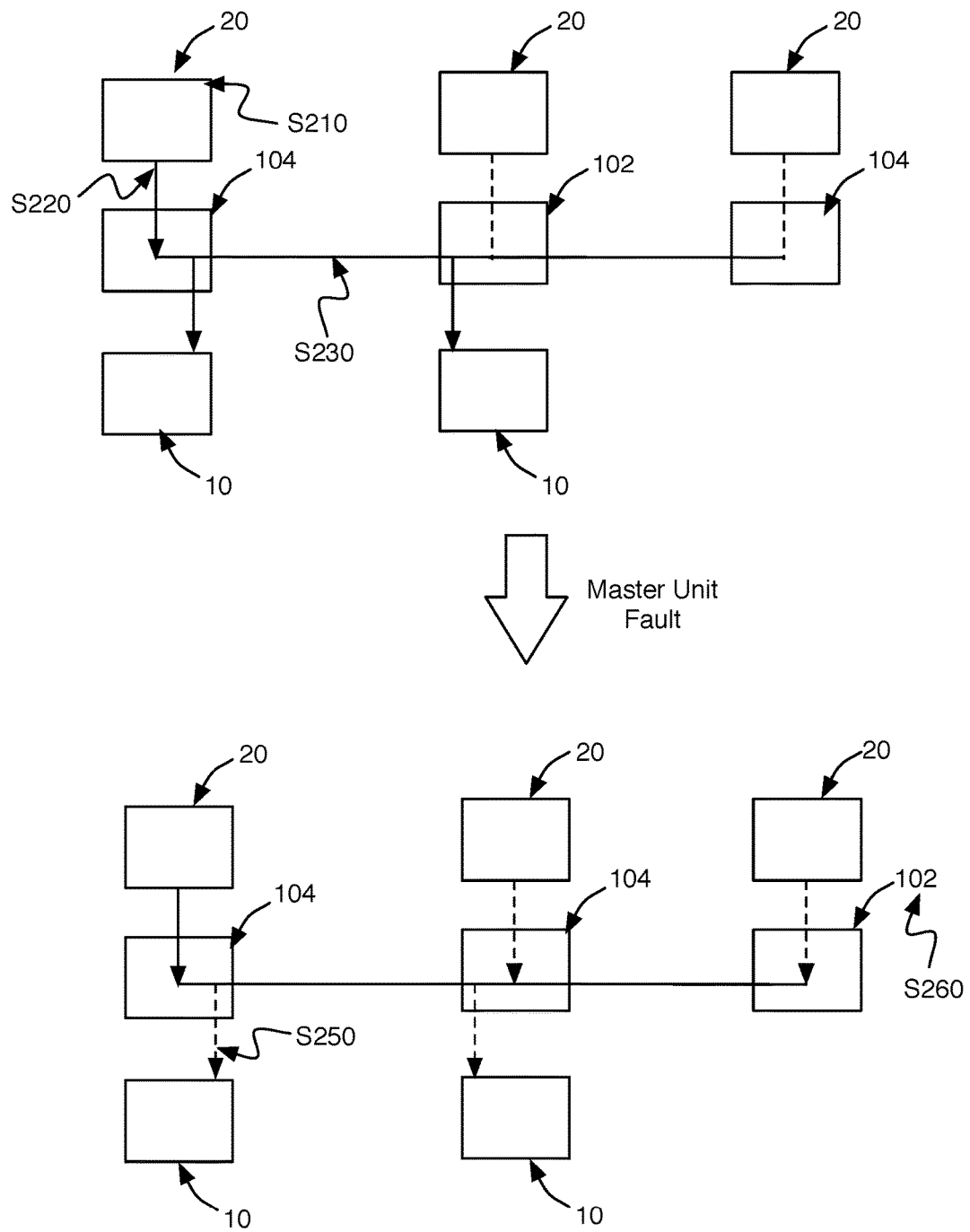
FIG. 6 is a schematic representation of a specific example of the microgrid unit operating in response to a master unit fault.

The microgrid unit is preferably operable in the connected mode S200 when the microgrid unit is connected to one or more microgrid units to form a microgrid system. More preferably, the microgrid unit is operable in the connected mode in response to detecting microgrid unit connection to a second microgrid unit. In the connected mode, the processor of a microgrid unit is designated as the master unit 102, and the processors of the remainder microgrid units are designated as slave units 104. The master controller preferably determines the optimal combination of power sources and loads, and commands the slave controllers to control the switches in the respective microgrid units to execute the optimal combination. The slave unit converters are preferably synchronized to the master converter. As shown in FIG. 6, all loads are preferably shed S250 (e.g., disconnected or instructed to turn off) in response to the master unit faulting and reconnected after a new master unit is selected S260, but control can alternatively be dynamically redistributed among the remaining functioning units (e.g., all remaining units can shift to operation in standalone mode). No loads are preferably shed in response to a slave unit faulting. The master controller is preferably the controller of the first microgrid unit that is turned on, but can alternatively be the microgrid unit with the lowest indexed number, the highest indexed number, the first recipient of data in a programming chain, or determined in any other suitable manner. Alternatively, the processor functionalities (e.g., selecting the optimal combination of power sources and loads, controlling the switches and power source operation, etc.) can be performed using distributed computing, wherein the processors of the microgrid units function as a distributed computing network. In the connected mode, the microgrid system preferably optimizes power provision from the power sources connected to the multiple microgrid units to the loads connected to the multiple microgrid units, optimizes power source operation, and selectively drops loads based on the respective priority, as described above. The microgrid system can additionally balance the internal and external power storage units, dynamically reroute power from the internal power storage units to external power storage units (or vice versa), or dynamically reroute power from an internal power storage unit of a first microgrid unit to an internal power storage unit of a second microgrid unit. The microgrid unit can operate in the connected mode in response to microgrid unit connection to a load, an AC and/or DC power sources, and one or more microgrid units. In one variation of the connected mode S200, as shown in FIG. 5, the microgrid unit selects the AC power source from the set of AC power sources connected to all of the microgrid units having the lowest capacity that satisfies the power demand from the loads S210, operates the selected power source in the power supply mode S220, and provides the power to the load S230. The microgrid unit can additionally route power from the DC source to charge the internal energy storage units S240, wherein the battery power can be used to supplement the AC power source when the power demand exceeds the power supply.

A first variation of microgrid unit or system operation includes: in response to a total power demand from loads electrically connected to the microgrid unit falling below the first capacity of a first power source connected to the microgrid, controlling the first power source to operate in a power supply mode and supplying power to the load. A second generator having a second capacity, if connected, is preferably maintained in an off mode. In response to the total power demand exceeding the first capacity, microgrid unit operation can include disconnecting the load from the microgrid unit, controlling the second power source to operate in a power supply mode, and in response to the second power source producing a threshold amount of power, electrically connecting the load to the microgrid unit and supplying power to the load. In response to the total power demand falling below the capacity of a power source operating in combination with a second power source, microgrid unit operation can include selecting instructing the second power source to turn off. For example, if a first, second, and third power source are simultaneously operating in the power supply mode and the power demand falls below the combined capacity of the first and second power sources, then the third power source is instructed to shut off.

A second variation of microgrid unit or system operation includes: in response to an energy storage unit state of charge (SOC) exceeding a first SOC threshold (e.g., a charged threshold, such as 70% capacity, 90% capacity, etc.), charging the power storage unit with DC power from the DC power source (e.g., the DC power source connected to the microgrid unit or the DC power source of a second, connected microgrid unit), supplying power from the power storage unit to the load through the power conversion module, and maintaining the AC power source (e.g., a generator connected to the microgrid unit or connected to a second microgrid unit) in an off mode. This operation variation can be used in the standalone mode or in the connected mode.

A third variation of microgrid unit or system operation includes: in response to the SOC of the energy storage unit falling below a second SOC threshold lower than the first SOC threshold, automatically disconnecting the load, operating the AC power source in a power supply mode, reconnecting the load, and supplying power from the AC power source to the load and the power storage unit. The load is preferably reconnected after the AC power source supplies power at a predetermined power threshold (e.g., power sufficient to satisfy the power demand from the load), but can alternatively be reconnected prior to AC power source provision at or beyond the power threshold, wherein power from the energy storage units can be used to supplement the existing power source capacity. This operation variation can be used in the standalone mode or in the connected mode.

A fourth variation of microgrid unit or system operation includes: selecting a combination of power sources from the plurality of connected power sources to satisfy a total power demand from a first and second load connected to a first and second microgrid unit, respectively, based on an electrical distance between each power source of the combination and the load having the highest power demand. Selecting a combination of power sources from the plurality of connected power supplies to satisfy a total power demand based on an electrical distance between each power supply of the combination and the load having the highest power demand preferably includes selecting the combination to minimize the electrical distance between the power supplies of the combination and the load having the highest power demand, but can alternatively include selecting the combination to minimize the electrical distance between the power supplies and the microgrid unit having the highest total power demand from the connected loads, selecting the combination to minimize the electrical distance between the power supplies and the microgrid unit having the highest number of connected loads, or selecting the combination to optimize for any other suitable parameter. This variation is preferably used in the connected mode, but can alternatively be used in the standalone mode.

A fifth variation of microgrid unit or system operation includes: in response to a total power demand from a first and second load connected to a first and second microgrid unit, respectively, exceeding a total power capacity of the power sources operating in power supply mode, dynamically shedding one of the first and second loads. Shedding a load preferably includes disconnecting the load (e.g., by opening a switch on a bus connecting the power source or power module to the load), but can alternatively include sending an instruction to the load to turn off. The variation further includes selecting a new combination of power supplies to supply at least the total power demanded, operating the new combination of power supplies in the power supply mode, and reconnecting the disconnected load.

A sixth variation of microgrid unit operation includes: detecting microgrid unit connection to a load, a first power source having a first capacity, and a second microgrid unit that is connected to a second and third power source having a second and third capacity, respectively; in response to the power demand from the load falling between the second capacity and the sum of the second and third capacity, switching the first generator to a power generating mode, maintaining the second and third generators in an off mode, and supplying power from the first generator to the load.

A seventh variation of microgrid unit operation includes: detecting microgrid unit connection to a load, a first power source having a first capacity, and a second microgrid unit that is connected to a second power source having a second capacity lower than the first capacity; in response to the power demand falling below the second capacity, controlling the second generator to operate in a power generating mode and maintaining the first and third generators in an off mode, receiving power generated by the second generator from the second microgrid unit, and supplying the received power to the load. This variation selects the generator combination to that minimizes the capacity of the power sources in operation.

An eighth variation of microgrid unit operation includes: detecting microgrid unit connection to a first load, a first power source having a first capacity, and a second microgrid unit that is connected to a second load and a second and third power source having a second and third capacity, respectively, switching the first generator to a power generating mode, maintaining the second and third generators in an off mode, supplying power from the first generator to the load, and supplying power from the first generator to the second microgrid unit. The sum of the second and third capacities is preferably less than the first capacity. The power demand from the first load is preferably higher than the power demand from the second load. The sum of the first and second power demands is preferably less than the sum of the second and third capacities. Conditioned power is preferably supplied to the second microgrid unit while unconditioned power (e.g., raw power) is supplied to the first load, but conditioned power can alternatively be supplied to the first load and unconditioned power supplied to the second microgrid unit. This variation selects the generator closest to the load with the highest demand over the generator combination to that would minimize the capacity of the power sources in operation.

A ninth variation of microgrid unit operation includes: directly providing power from a first power source (e.g., a generator) to a load; in response to the power demand from the load exceeding the capacity of the power source, using power from a battery to supplement power from the first power source during the start-up phase of a second power source; providing power from the first and second power source to the load; and charging the battery with excess power from the first and/or second power source. Alternatively, battery or other power from energy storage units can be used to supplement generator power during run-through, generator switching or start-up, or generator failure periods.

In one example of a microgrid unit, the microgrid unit is connected to a first and second fuel-consuming power source, a non-fuel consuming power source (e.g., a renewable power source), and a load. The first power source preferably has a smaller capacity (first capacity, as determined from the maximum power capacity that is within the efficient operating range for the generator) than the second power source (second capacity), and the load has a power demand lower than the first capacity. The processor preferably controls the first power source to operate in the power supply mode and supplies the power to the load, either directly or after conditioning. The power from the non-fuel consuming power source is used to charge an internal battery. In response to the power demand exceeding the first capacity, power from the first generator is supplemented by battery power until the second generator can provide sufficient power to satisfy the load. The amount of battery power can be gradually decreased as power from the second generator is gradually increased. The first generator can be shut off after the second generator is in full operation if the new power demand falls between the first capacity and the second capacity. Alternatively, the load can be dropped, the first generator shut off, the second generator turned on, and the load reconnected after the second generator power sufficient to satisfy the new power demand. Alternatively, the load connection or operation can be maintained while the first generator is shut off and the second generator is turned on, wherein the load power demand can be satisfied by power from the battery. However, the microgrid unit can operate in any other suitable manner.

Figure 7:
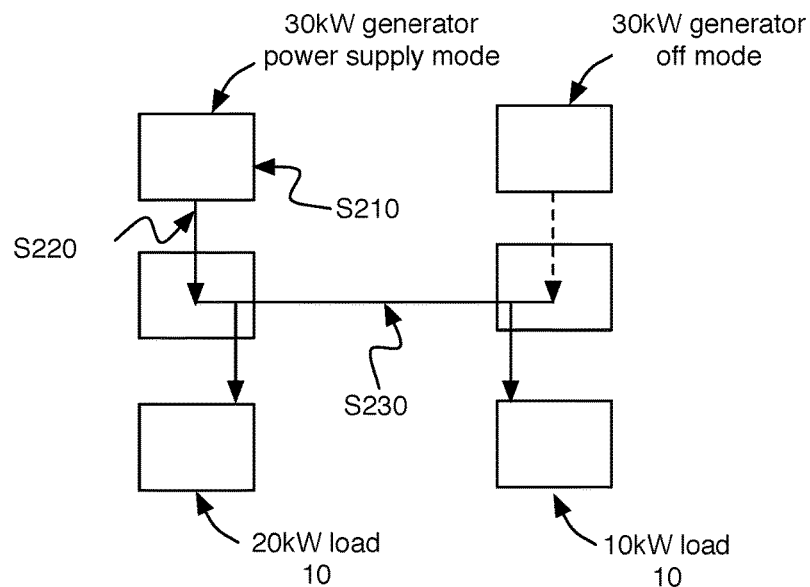
FIG. 7 is a schematic representation of a first specific example of the microgrid operating in the connected mode.

In another example of a microgrid system, as shown in FIG. 7, the microgrid system includes a first and second microgrid unit connected in parallel. The first microgrid unit is connected to a first 30 kW power source (e.g., generator) and a 20 kW load and the second microgrid unit is connected to a second 30 kW power source (e.g., generator) and a 10 kW load. The system controller (e.g., the processor of the first or second microgrid, an external controller, etc.) preferably controls the first 30 kW power source to operate in the power supply mode and maintains the second 30 kW power source in the off mode to minimize the distance between the power source in operation and the largest load. The first microgrid unit preferably supplies the excess power to the second microgrid unit to power the 10 kW load.

Figure 8:
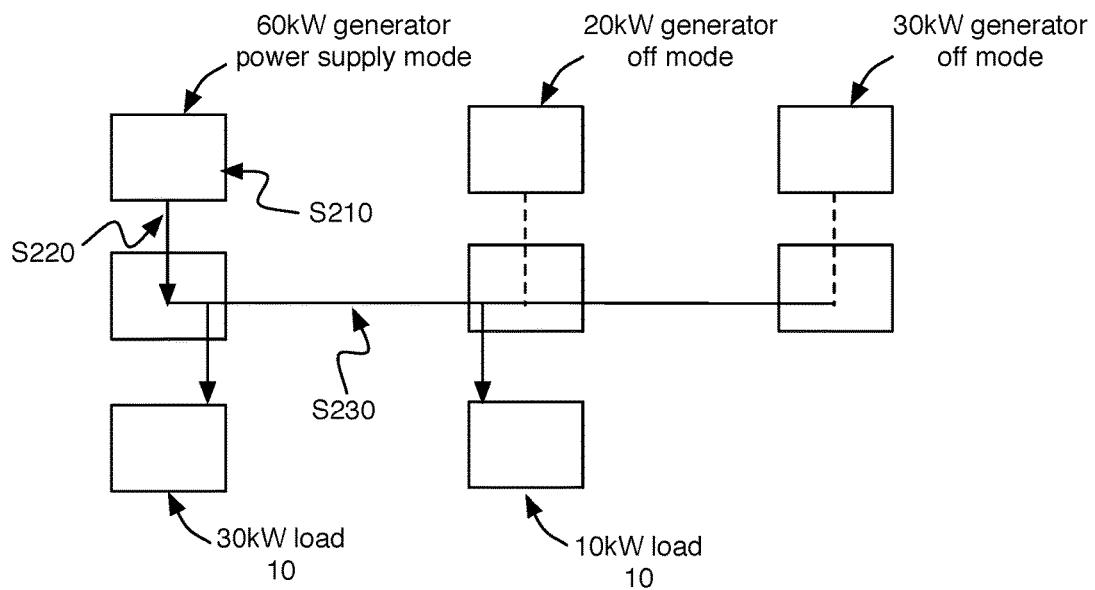
FIG. 8 is a schematic representation of a second specific example of the microgrid operating in the connected mode.
Figure 9:
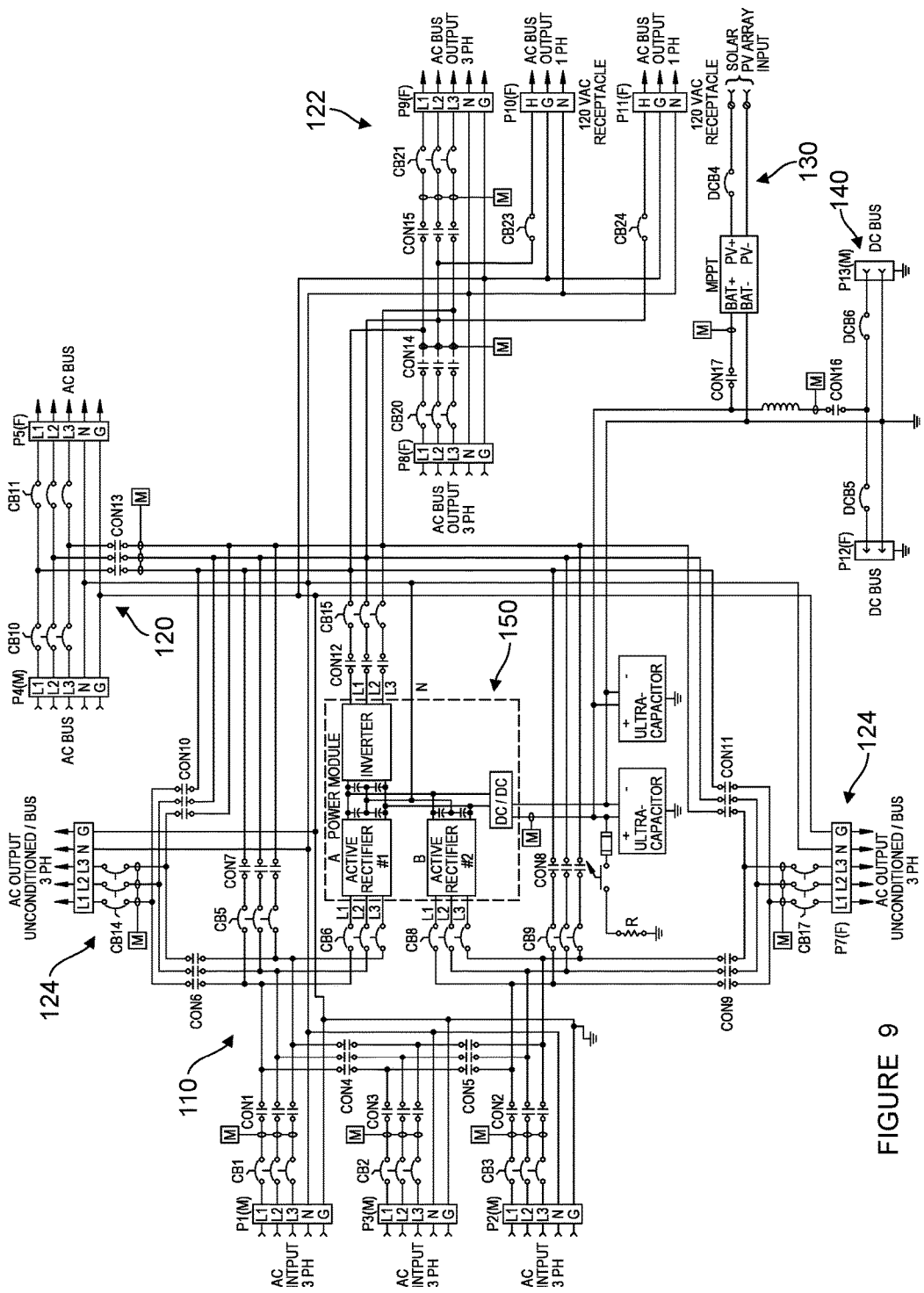
FIG. 9 is a circuit diagram of a specific example of the microgrid unit circuitry.

In another example of a microgrid system, as shown in FIG. 8, the microgrid system includes a first, second, and third microgrid unit connected in parallel. The first microgrid unit is connected to a 60 kW power source (e.g., generator) and a 300 kW load, the second microgrid unit is connected to a second 20 kW power source (e.g., generator) and a 10 kW load, and the third microgrid unit is connected to a 300 kW power source and no load. The system controller preferably controls the 60 kW power source to operate in the power supply mode (e.g., at full or most optimal capacity), maintains the 300 kW and 20 kW power supplies in an off state, and routes power from the first microgrid unit to the second microgrid unit.

As a person skilled in the art will recognize from the previous detailed description and from the figures and claims, modifications and changes can be made to the preferred embodiments of the invention without departing from the scope of this invention defined in the following claims.

I claim:

1. A stand-alone mobile microgrid unit disconnected from utility power and configured to connect to AC and DC power sources, the microgrid unit comprising:
an AC input bus configured to connect to an AC power source;
an unconditioned AC output bus electrically connected to the AC input bus and configured to connect to a load;
a conditioned AC output bus configured to connect the microgrid unit in parallel with a second load and a second microgrid unit;
a DC input bus configured to receive DC power from a DC power source;
a DC output bus configured to connect the microgrid unit in parallel with the second microgrid unit;
a power storage unit configured to store and supply electrical power;
a power conversion module configured to convert a range of frequencies of AC power from the AC power source to DC power and to convert DC power to AC output power, the power conversion module electrically connected to the AC input bus, the conditioned AC output bus, the DC input bus, the DC output bus, and the power storage unit;
a processor configured to operate the microgrid unit between:
a standalone mode in response to determination of connection between the microgrid unit and a load having a power demand, a DC power source, and an AC power source, comprising:
dynamically powering the load from a power source of a set of power sources comprising the AC power source, DC power source, and the power storage unit based on a power storage unit state of charge; and
a connected mode in response to determination of connection between the microgrid unit and the load, the DC power source, the AC power source, and a second microgrid unit, the second microgrid unit connected to a second AC power source and the second load having a second power demand, the connected mode comprising:
selecting a combination of power sources from the plurality of connected power sources to satisfy a total power demand from the first and second loads based on an electrical distance between each power source of the combination and the load having the highest power demand;

in response to a total power demand from the first and second loads exceeding a total power capacity of the power sources operating in power supply mode, dynamically shedding one of the first and second loads;

operating the selected combination of power sources in the power supply mode; and connecting the disconnected load.

2. The method of claim 1, wherein dynamically shedding one of the first and second loads comprises shedding the second load, wherein the second load has a lower priority than the first load.

3. The method of claim 1, wherein the power module comprises an inverter connected to the conditioned AC output bus, a converter connected between the DC input bus and the inverter, and a rectifier connected between the AC input bus and the inverter.

4. The method of claim 1, wherein selecting a combination of power sources from the plurality of connected power supplies to satisfy a total power demand based on an electrical distance between each power supply of the combination and the load having the highest power demand comprises selecting the combination to minimize the electrical distance between the power supplies of the combination and the load having the highest power demand.

5. The method of claim 1, wherein the AC power source comprises a mobile fuel consuming generator operable between a power supply mode wherein power is supplied from the generator to the respective microgrid unit and an off mode.

6. The method of claim 1, wherein the DC power source comprises a mobile non-fuel consuming power supply operable between a power supply mode wherein power is supplied from the generator to the respective microgrid unit and an off mode.

7. The method of claim 1, wherein the second module is connected in parallel with the first module.

8. The method of claim 1, wherein the first AC input comprises a first generator having a first capacity, the second AC input comprises a second generator having a second capacity lower than the first capacity, the total power demand is lower than the second capacity, and the second power demand is lower than the first power demand, selecting a combination of power sources comprises selecting the first generator.

* * * * *